Aug. 14, 1962  S. D. KLAUS  3,048,925
METHOD FOR LOCATING HIDDEN WALL STUDS
Filed Aug. 5, 1959  2 Sheets—Sheet 1
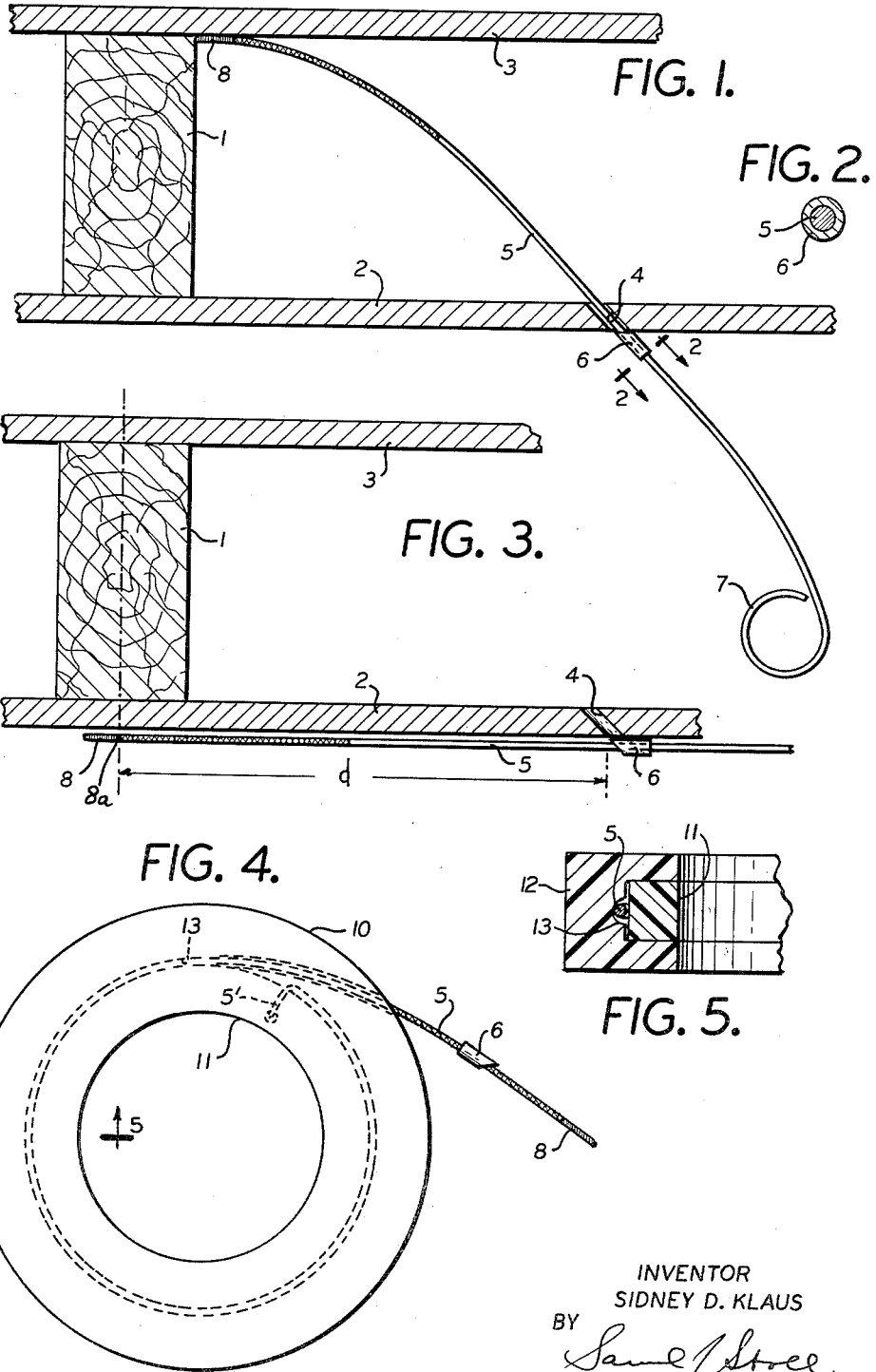
INVENTOR
SIDNEY D. KLAUS
BY
*Samuel J. Stoel*
ATTORNEY.

Aug. 14, 1962  S. D. KLAUS  3,048,925
METHOD FOR LOCATING HIDDEN WALL STUDS
Filed Aug. 5, 1959   2 Sheets-Sheet 2

INVENTOR
SIDNEY D. KLAUS
BY
ATTORNEY.

United States Patent Office 3,048,925
Patented Aug. 14, 1962

3,048,925
METHOD FOR LOCATING HIDDEN WALL STUDS
Sidney D. Klaus, Westbury, N.Y.
(88—06 Parsons Blvd., Jamaica, N.Y.)
Filed Aug. 5, 1959, Ser. No. 831,791
1 Claim. (Cl. 33—169)

This invention relates to a method for locating hidden wall studs or ceiling beams.

It is often necessary to determine the position of studs which are hidden behind a wall, for instance, a plasterboard wall, for the purpose of hanging heavy pictures, mirrors, shelves, or other equipment on the wall. There is no easy way to determine the position of such studs, and it is generally necessary to drive a series of nails along the wall until the location of the stud is determined by trial and error. This procedure leaves a number of nail holes in the wall.

Magnetic devices have been used in an effort to find the nails in a stud. However, these devices are responsive only to large nails and will also respond to other metal in the walls such as electrical conduits and metal lathwork.

The present invention provides a simple and reliable method of locating such studs and more particularly the approximate center portions thereof. The invention comprises a curved, thin wire probe having a sliding marker thereon and having a flat handle in the plane of the curve for the purpose of holding the probe in a horizontal plane (vertical plane in the case of ceiling beams). A very small hole is drilled in the wall board at an angle of 45° to the surface. The probe is then inserted in the hole until it comes in contact with the nearest wall stud. The marker is then adjusted to the wall surface. The probe is then removed and when the marker is placed adjacent to the hole and the probe is straightened out along the wall surface, the end of the probe will indicate the location of the central portion of the stud. There are variations in this procedure in connection with different wall conditions which may be encountered and a full description of these various procedures will follow.

Accordingly, a principal object of the invention is to provide new and improved means for locating hidden wall studs and ceiling rafters and to ascertain the location of their center portions.

Another object of the invention is to provide new and improved methods for locating a hidden wall stud.

Another object of the invention is to provide new and improved means for locating objects hidden behind a wall, comprising a curved thin wire probe, a sliding marker on said probe and a flat handle connected to the end of said probe, said handle being in the plane of said curve.

These and other objects of the invention will be apparent from the following specification and drawings, of which:

FIG. 1 is a plan view partially in section showing an embodiment of the invention in use in connection with a hollow wall concealing 2" x 4" studs, the probe being inserted into said wall.

FIG. 2 is a sectional view taken along the line 2—2 of FIG. 1.

FIG. 3 is a plan view partially in section illustrating the use of the invention, the probe being held flat against the wall.

FIG. 4 shows another embodiment of the invention with a roll-up handle.

FIG. 5 is a sectional view taken along the line 5—5 of FIG. 4.

Figure 6:
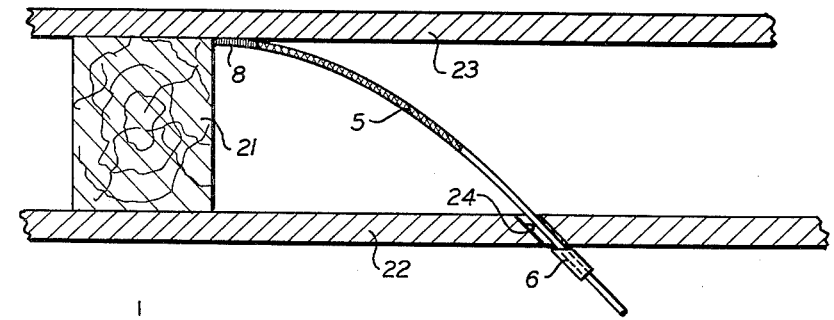
FIG. 6 is a sectional view similar to that of FIG. 1 but showing a condition which would be encountered in connection with concealed 2" x 3" studs.

FIG. 1 illustrates the particular problem, namely, to locate the center of stud 1 which is hidden behind the wall 2. The studs are generally of 2" x 3" or 2" x 4" lumber, and there is generally another wall 3 mounted on the other side of the stud. In FIG. 1 a 2" x 4" stud is illustrated.

The method of the present invention is to drill a small hole 4 at an angle of approximately 45° to the surface of the wall 2. The locating of the hole may be at random and does not require any measuring. The locating means of the present invention comprises a thin curved wire probe 5 having a sliding marker 6 and a flat handle 7 which is in the plane of the curve of the probe. The purpose of the flat handle is to hold the probe between the thumb and forefinger so that the curve of the probe is in a horizontal plane. The handle need not, however, be flat providing it has some indexing means in the plane of the curve of the probe. The probe is then inserted into the wall until the tip 8 of the probe comes in contact with stud 1. The probe is curved so that it will slide along the adjacent wall 3. Of course, if the hole 4 has been chosen near enough to the stud 1 to begin with, the probe 5 will hit the stud 1 before it hits the adjacent wall 3. This is a condition which will be discussed in connection with FIGS. 8 and 9.

The marker 6 is then slid along the probe so that it comes in contact with the outer surface of the wall 2. The probe is then withdrawn from the wall and placed along the outside surface of the wall shown in FIG. 3 with the marker 6 adjacent the hole 4. When the probe is straightened out and held in the position shown in FIG. 3, the inner end 8a of tip 8 of the probe will indicate the center portion of the stud 1 within suitable limits for nailing purposes. The stud 1 is generally at least 1¾" thick in the direction parallel to the wall so that a tolerance of plus or minus ¼" can be tolerated. Wall studs are generally placed every 16 inches so that the probe need not be more than 16 inches long and may be shorter.

FIG. 4 shows another embodiment of the invention having a wind-up type handle 10 which is adapted to wind up the probe similarly to a tape measure. The handle 10 has a great enough radius so that about one turn will accommodate the length of the probe. The handle may comprise an inner ring 11 which fits inside an outer ring 12 which contains a groove 13 for receiving the probe 5. The groove 13 continues through the ring 10 to the outer surface thereof. The end of the probe 5' is preferably hooked over and anchored in the inner ring 11 so that the probe may be wound by rotating the inner ring with respect to the outer ring 12.

Figure 7:
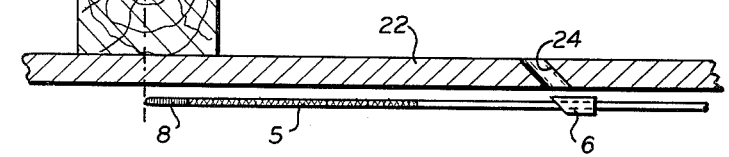
FIG. 7 is a view similar to that of FIG. 3, showing the probe held flat against the wall.
Figure 8:
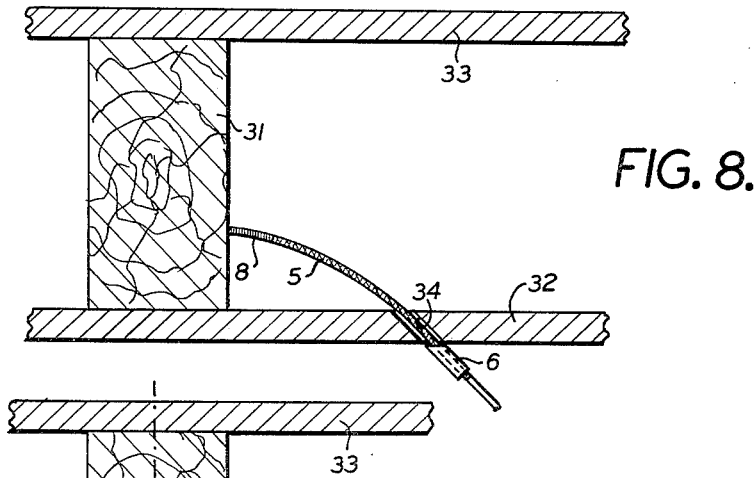
FIG. 8 is another view similar to that of FIG. 1 but showing the condition which arises when the probe strikes a concealed stud without making contact with the opposite side wall.
Figure 9:
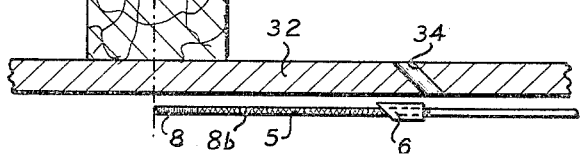
FIG. 9 is a view similar to that of FIG. 3 showing the probe held flat against the wall.

Referring now to FIGS. 6 and 7, it will be observed that the probe may be used in connection with a wall having concealed 2" x 3" studs instead of the 2" x 4" studs shown in FIGS. 1 and 3. The wall structure shown in FIGS. 6 and 7 comprises a plurality of studs 21 concealed between a pair of walls or wallboards 22 and 23. A hole 24 is formed at random in wall 22 at an angle of approximately 45° relative to said wall but in a horizontal plane. The probe is inserted through said hole, as previously described, until it strikes stud 21 after passing along wall 23. Slide 6 is then moved into contact with wall 22 as shown in FIG. 6. The probe is then withdrawn from said hole and placed flat against wall 22, as shown in FIG. 7. The end of tip 8 will indicate the approximate center of stud 21. Reference to FIGS. 8 and 9 will disclose the use of the present device in connection with a 2" x 4" stud in a situation in which the hole is formed in the wall closely adjacent the stud. As shown in FIG. 8, the probe is inserted through a hole 34 formed in wall 32 in close proximity to stud 31. So close is hole 34 to stud 31 that the probe encounters said stud without ever reaching the opposite wall 33. It will now be observed that the probe is provided with a marked section 8b (immediately behind tip 8) which may be approximately 4 inches long. When a portion of section 8b remains exposed outside of hole 34, after the probe has been inserted as far as it will go, this will constitute a signal that the probe has encountered the stud without touching wall 33. Slide 6 is brought into abutment with wall 32 in the usual way, but when the probe is placed flat against the wall, as shown in FIG. 9, said slide is placed on that side of hole 34, which is closer to stud 31, whereas in all prior applications, for example in FIG. 7, the slide is placed on the far side of the hole. As shown in FIG. 9, the end of tip 8 will now indicate the approximate center of stud 31.

Therefore, the present invention provides means for locating a hidden wall stud with accuracy and a minimum of trouble. The very small hole required with the present device may be placed inconspircuously, for instance, along a base board. The invention is not limited to use with walls but may also be used with ceilings by holding the probe in a vertical plane and there may be various other applications for locating hidden objects, which will occur to those desiring to practice the invention.

Many modifications may be made without departing from the scope of the invention which is defined in the following claim:

I claim:

The method of locating the approximate center of a vertical stud concealed between an inner and an outer wall, comprising the steps of: drilling a horizontal hole in said inner wall at an acute angle thereto, inserting a relatively flexible, curved probe through said hole in a horizontal plane and causing the tip of said probe to ride against said outer wall until it is stopped by said stud, marking said probe at a point adjacent said hole, withdrawing the probe and placing said probe flat against said inner wall in said horizontal plane with said marked point adjacent said hole, the tip of the probe pointing in the general direction of said stud, said tip indicating the approximate center of the stud.

References Cited in the file of this patent

UNITED STATES PATENTS

| | | |
|---|---|---|
| 745,357 | Lanham | Dec. 1, 1903 |
| 812,411 | Doern | Feb. 13, 1906 |
| 1,718,003 | Prsha | June 18, 1929 |
| 1,811,945 | Lange | June 30, 1931 |
| 2,600,722 | Atkinson | June 17, 1952 |
| 2,992,488 | Berrett | July 18, 1961 |